Oct. 16, 1951     C. DE LA SOURCE     2,571,545

ASSEMBLING DEVICE AND APPLICATION THEREOF

Filed July 11, 1947

INVENTOR
CHARLES DE LA SOURCE
BY Otto Munk
HIS ATTY

Patented Oct. 16, 1951

2,571,545

UNITED STATES PATENT OFFICE 2,571,545

ASSEMBLING DEVICE AND APPLICATION THEREOF

Charles de la Source, Paris, France, assignor to Societe: Les Fils de Peugeot Freres, Valentigney, France, a French company Application July 11, 1947, Serial No. 760,462
In France July 25, 1946

1 Claim. (Cl. 287—119)

The present invention relates to the assembling by fitting into one another of two parts of members, one of which is provided with a cavity, into which penetrates and is gripped a male portion of the other part.

In assemblies of this type heretofore known and used, in particular, for fixing shafts, rods, tool handles, etc. in order to obtain a suitable assembly of the parts, it is necessary to adjust said parts accurately beforehand. Furthermore, the value of the grip depends on this adjusting and cannot be changed after said parts have been made.

One object of the invention is an assembly wherein the gripping between the two parts, which have previously been assembled without accurate adjusting and without gripping, is obtained by means of an unresilient and incompressible deformable auxiliary element which is housed in the assembly and is permanently transversely expanded, after assembling, by axial compression.

According to a preferred embodiment, the male part is provided, in its portion engaged in the hole of the female part, with a cavity in which a deformable substance has been radially expanded by means of an axial compression, in such a manner that the expansion of said substance produces a radial expansion of the male part in the hole of the female part.

The invention makes it possible to assemble parts which are in no way accurate and which are loosely inserted in one another. The gripping force can be adjusted at will, by axially compressing the deformable element more or less. Furthermore, the assembling operation can be carried out very quickly.

The invention also has for its object the various applications of this assembly, in particular for coupling cylindrical parts of small size, such as: pins in their housings, rods assembled end to end, fixing tool shanks or handles, fixing articulation rivets, etc.

Other characteristics will become apparent from the ensuing description.

In the accompanying drawing, which is given solely by way of example:

Figure 1:
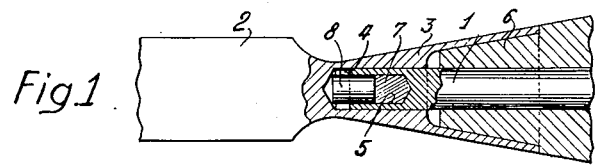
Fig. 1 is a longitudinal section of the fixing according to the invention of a stem or tang fitted to a wood-chisel or like tool.

According to the embodiment shown in Fig. 1, the invention is assumed to be applied to the fixing of a stem or tang 1 to the steel body 2 of a wood-chisel or like tool.

According to this embodiment, the body 2 of the tool is provided with a ferrule 3 integral therewith. In the bottom of the ferrule is provided an axial hole 4. The stem 1, of highly resilient metal, is provided at its end, along the axis thereof, with a blind hole 5. At 6 is shown the beginning of the handle. Inside the hole 5 of the stem 1 is placed an intermediate element, in the form of a cylindrical body 7, made of soft alloy: aluminum, copper, lead, or any other metal, or again of any unresilient substance which can be permanently deformed and transmit a substantially uniform pressure. Finally, a steel dowel 8 is placed at the end of the element 7.

The parts having been placed inside one another, as shown in Fig. 1, the assembly is mounted on a press in order to receive the axial compression force between the ends of the tool.

The force is transmitted by the stem 1, the body 2 and the dowel 8, to the intermediate element 7. Said element is compressed and swells diametrically to the extent to which there are clearances between the various parts. Then, owing to its deformation, said element, in its turn, exerts a heavy pressure on the inner walls of the hole 5 of the rod 1 which expands and is thereby firmly gripped inside the hole 4 of the tool body 2. The assembly of the parts 1 and 2 is thus obtained. The gripping force can be adjusted by varying the axial compression force.

This same method of assembling can be used for all hand tools having an added shank, such as joiners' and carters' chisels, mortice-chisels, gouges, screw drivers, etc.

Figure 2:
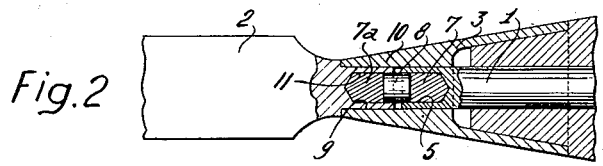
Figs. 2 and 3 are similar views of two other embodiments.

Fig. 2 shows a modification of this method of assembling, applied to a tool having a separately fitted ferrule. The tool body is shown therein at 2, the shank at 1, the ferrule at 3. Said ferrule has a hole 9 extending right through it in which are inserted the shank 1 and a cylindrical portion 10 of the body 2. Two intermediate elements 7 and 7a are provided, which are respectively housed in the hole 5 of the shank 1 and in a hole 11 of the cylindrical portion 10 of the body 2. A steel dowel 8 housed between the two elements 7 and 7a transmits the compression force to said two elements so that owing to their radial expansion they grip the shank and the portion 10 of the body 2 in the ferrule 3.

Figure 3:

The use of the dowel 8 is not absolutely necessary, as shown in Fig. 3, in which the two elements 7 and 7a of the previous example are replaced by a single element 7b. It may however happen that the substance of said element 7b expands into the space between the ends of the parts 1 and 2, and forms an obstacle to the closing together of said parts when the compression force is applied, so that the solution of Fig. 2 is preferable.

Figure 4:
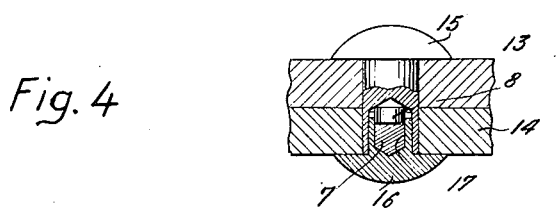
Fig. 4 shows in section the assembly of a two-part rivet.

Fig. 4 shows an articulation rivet, for example, for the two arms 13 and 14 of a pair of pliers or pincers. In one of the arms, the rivet has to be loose in order to enable it to pivot; in the other arm, the pin has to be tight. The rivet is in two parts 15, 16. Gripping is obtained by means of a compression element 7 which is radially expanded inside the cavity 17 provided in the portion 16 of the rivet. A steel dowel is placed at 8.

Figure 5:
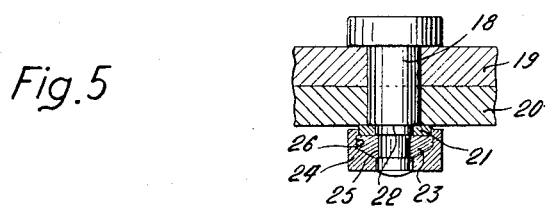
Fig. 5 shows the locking of a pivot on the parts pivoted thereon.

Fig. 5 shows a pivot 18 for parts 19 and 20. The pivot 18 has a head which is fitted by means of the same method. A washer 21 bears against a shoulder 22 of the pivot and transmits the compression force to an element 23 housed about the pivot inside a second compression member 24. The end of the pivot and the inside of the part 24 are provided with grooves 25 and 26 into which the material of the element 23 is forced by the effect of the axial compression.

Figure 6:
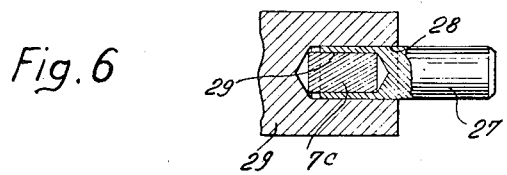
Fig. 6 shows a modification of the fixing of a pivot or journal at the end of a shaft or other part.

A modification of the invention may consist in obtaining a first approximate gripping of the assembly, by the use of an element 7c of slightly larger dimensions than that of the housing into which it is forced. Fig. 6 shows this arrangement applied to a pivot 27 which is to be gripped in the housing 28 of a part 29. The element 7c is constructed of slightly larger size than that of the hole 30 of the pivot 27. Owing to this fact, its insertion into the pivot will cause same to expand and produce a first gripping of the parts. This gripping is then completed at the end of the operation by the deformation by compression of the element 7, as hereinbefore described.

Naturally, the invention is in no way limited to the embodiments illustrated and described which have only been chosen by way of example.

These examples only illustrate a few applications of the invention to articles of ironmongery. But it is obvious that numerous other applications can be provided, with modifications enabling the invention to be adapted to various articles.

It should be noted, in particular, that the parts to be assembled may be of any cross-sectional shape: circular, square, polygonal, etc.

The parts may be made of metal or of any other material capable of undergoing a slight deformation.

Having now described our invention what we claim as new and desire to secure by Letters Patent is:

A device for assembling two parts, including the combination of a first part provided with a recess, a second part having a stud portion having a longitudinal blind bore opening therefrom, an insert of soft material confined inside said bore and a dowel of hard material, one end of which is adapted to fit the mouth of said bore to bear on the insert while its opposite end is adapted to project beyond said stud to contact the bottom of said recess upon the said stud portion being inserted therein, whereby bringing the two parts together under heavy pressure causes the insert to be compressed and the walls of said bore to be expanded into tight engagement with the inner wall of said recess.

CHARLES DE LA SOURCE.

REFERENCES CITED

The following references are of record in the file of this patent:

UNITED STATES PATENTS

| Number | Name | Date |
|---|---|---|
| 783,023 | Converse | Feb. 21, 1905 |
| 2,083,006 | Deems | June 8, 1937 |
| 2,142,586 | Gort | Jan. 3, 1939 |
| 2,181,467 | Stolnacke et al. | Nov. 28, 1939 |
| 2,240,199 | Wilson | Apr. 29, 1941 |
| 2,259,368 | Febrey | Oct. 14, 1941 |
| 2,300,356 | Febrey | Oct. 27, 1942 |
| 2,311,874 | Sabol | Feb. 23, 1943 |
| 2,438,976 | Lautman | Apr. 6, 1948 |
| 2,508,225 | Clark | May 16, 1950 |